(12) United States Patent
Kornecki et al.

(10) Patent No.: US 8,770,119 B1
(45) Date of Patent: Jul. 8, 2014

(54) COVER CROP RESIDUE MANAGER

(75) Inventors: Ted S. Kornecki, Auburn, AL (US);
Henry A. Torbert, III, Opelika, AL (US); Stephen A. Prior, Auburn, AL (US)

(73) Assignee: The United States of America as represented by the Secretary of Agriculture, Washington, DC (US)

( * ) Notice: Subject to any disclaimer, the term of this patent is extended or adjusted under 35 U.S.C. 154(b) by 504 days.

(21) Appl. No.: 13/048,362

(22) Filed: Mar. 15, 2011

(51) Int. Cl.
*A01B 49/04* (2006.01)

(52) U.S. Cl.
USPC .......................... 111/143; 172/514; 172/517

(58) Field of Classification Search
USPC .......... 111/139, 143, 144, 102, 924; 172/508, 172/515, 517, 514; 56/121.42
See application file for complete search history.

(56) References Cited

U.S. PATENT DOCUMENTS

| | | | | | |
|---|---|---|---|---|---|
| 407,062 | A | * | 7/1889 | Cook | 172/515 |
| 591,873 | A | * | 10/1897 | Nebbe | 172/515 |
| 597,644 | A | * | 1/1898 | Gongwer | 111/190 |
| 602,663 | A | * | 4/1898 | Motherwell | 172/354 |
| 642,531 | A | * | 1/1900 | Ross | 172/515 |
| 644,375 | A | * | 2/1900 | Steffes | 172/515 |
| 770,878 | A | * | 9/1904 | Vivion | 111/141 |
| 1,107,224 | A | * | 8/1914 | Perrine | 111/81 |
| 1,261,150 | A | * | 4/1918 | Mountjoy | 172/515 |
| 1,349,896 | A | * | 8/1920 | McCready | 172/517 |
| 1,524,324 | A | * | 1/1925 | Wheeler | 172/684.5 |
| 2,161,714 | A | * | 6/1939 | Lindelof | 172/515 |
| 2,487,609 | A | * | 11/1949 | Sparks | 172/515 |
| 2,839,984 | A | * | 6/1958 | Knight | 172/166 |
| 2,989,129 | A | * | 6/1961 | Sisk | 172/515 |
| 3,126,062 | A | * | 3/1964 | Schmidt | 171/42 |
| 3,331,449 | A | * | 7/1967 | Blocker | 172/159 |
| 3,826,315 | A | * | 7/1974 | Blair | 172/514 |
| 4,282,985 | A | * | 8/1981 | Yamamoto | 221/254 |
| 4,407,207 | A | * | 10/1983 | Dreyer | 111/136 |
| 4,452,315 | A | * | 6/1984 | Swanson | 172/29 |
| 4,592,428 | A | * | 6/1986 | Whitney | 172/81 |
| 4,697,645 | A | * | 10/1987 | Jiskoot | 172/510 |
| 4,753,297 | A | * | 6/1988 | Mayeda et al. | 172/4 |
| 5,172,768 | A | * | 12/1992 | Straus | 172/89 |
| 5,403,026 | A | * | 4/1995 | Dahl | 280/156 |
| 7,861,660 | B2 | | 1/2011 | Martin | |
| 8,079,424 | B2 | * | 12/2011 | Larsen et al. | 172/515 |
| 2009/0301367 | A1 | | 12/2009 | Martin | |
| 2010/0000451 | A1 | | 1/2010 | Martin et al. | |

OTHER PUBLICATIONS

Torbert, H.A. et al., High Residue Conservation Tillage System for Cotton Production: A Farmer's Perspective, Proc, 25th Southern Conservation Tillage Conference, 2002, pp. 36-41.

* cited by examiner

*Primary Examiner* — Jamie L McGowan
(74) *Attorney, Agent, or Firm* — John Fado; Robert D. Jones; Lesley Shaw

(57) ABSTRACT

The residue manager deflects cover crop stalks and flattens cover crop residue during a no-till or minimum-till agricultural planting process. The residue manager apparatus comprises an "A" shaped frame. A leading portion of the frame is designed to deflect cover crop stalks. Press shoes attached to an intermediate portion of the frame depress cover crop residue that is not deflected by the leading portion. The trailing portion of the residue manager frame is configured to attach to existing planting mechanisms, such as seed drills. As the residue manager is propelled across a field of cover crops, the residue manager deflects cover crop stalks and depresses cover crop residue adjacent to the planting mechanism so that the planting process is not obstructed by the cover crop biomass on the surface of the field.

19 Claims, 4 Drawing Sheets

COVER CROP RESIDUE MANAGER

FIELD OF THE INVENTION

The present invention relates to a method and apparatus for managing crop residue in minimum-till and no-till agricultural systems. Specifically, the invention relates to a method and apparatus for deflecting and flattening cover crop residue so that a planting mechanism can effectively penetrate the cover crop residue.

BACKGROUND OF THE INVENTION

Cover crops are an important part of no-till and minimum-till agricultural conservation systems. For the purpose of this disclosure, the term "cover crops" includes crops that are intentionally allowed to remain in a target field as a means of improving growing conditions in the field. Cover crops include crops that are grown for the sole purpose of enhancing growing conditions in anticipation of a subsequently planted cash crop, as well as crop stalks and residue that remain in a field after the harvest of a previous cash crop.

Among other things, cover crops reduce soil erosion, increase soil moisture retention, increase soil organic matter, suppress weeds, and reduce soil compaction. However, these benefits are derived primarily through the cover crop biomass that remains on (or under) the soil surface after the cover crops are terminated. To plant a subsequent cash crop, a seed drill or other planting mechanism must penetrate the biomass and deposit a seed at a selected soil depth beneath the cover crop biomass.

Prior art inventions that perform a similar function are known as "row cleaners". Row cleaners generally comprise a plurality of spiked wheels positioned just ahead of the seed planting mechanism. As the spiked wheels rotate, the spikes part the cover crop residue so that a seed planting mechanism is not obstructed by the cover crop.

Although row cleaners are marginally effective with short, dried cover crops, when the cover crops are tall (as with rye), the spiked wheels themselves are quickly entangled in the cover crop biomass so that the row cleaners are essentially useless. Even in ideal applications, the mechanical nature and continuous rotation of the row cleaners' spiked wheels results in relatively frequent breaking and jamming of the rotating mechanisms. In many applications row cleaners do not improve the planting process and their use only results in unnecessary drag and mechanical down time.

The need exists for a light weight residue manager/row cleaner with minimal moving parts that is capable of increasing the effectiveness of a no-till/minimum-till planting mechanism. The crop residue manager of the current invention deflects the stalks of a cover crop away from an associated planting mechanism and then flattens the crop residue adjacent to the planting mechanism so that the planting mechanism effectively penetrates the cover crop biomass and does not become entangled in the residue.

SUMMARY OF THE INVENTION

The current invention is directed to a cover crop residue manager. The residue manager comprises a leading portion, a trailing portion, and an intermediate portion. The leading portion of the residue manager deflects cover crops away from a planting mechanism, which is attached to the trailing portion of the residue manager. A cover crop depressing means ("press shoes") is attached to the intermediate portion of the residue manager.

In operation, as the residue manager is propelled across a field of cover crops, the leading portion of the residue manager deflects cover crop stalks and the press shoes depresses cover crop residue adjacent to the planting mechanism so that the planting mechanism is not obstructed by the cover crop biomass on the surface of the field.

DETAILED DESCRIPTION OF PREFERRED EMBODIMENTS

Figure 1:
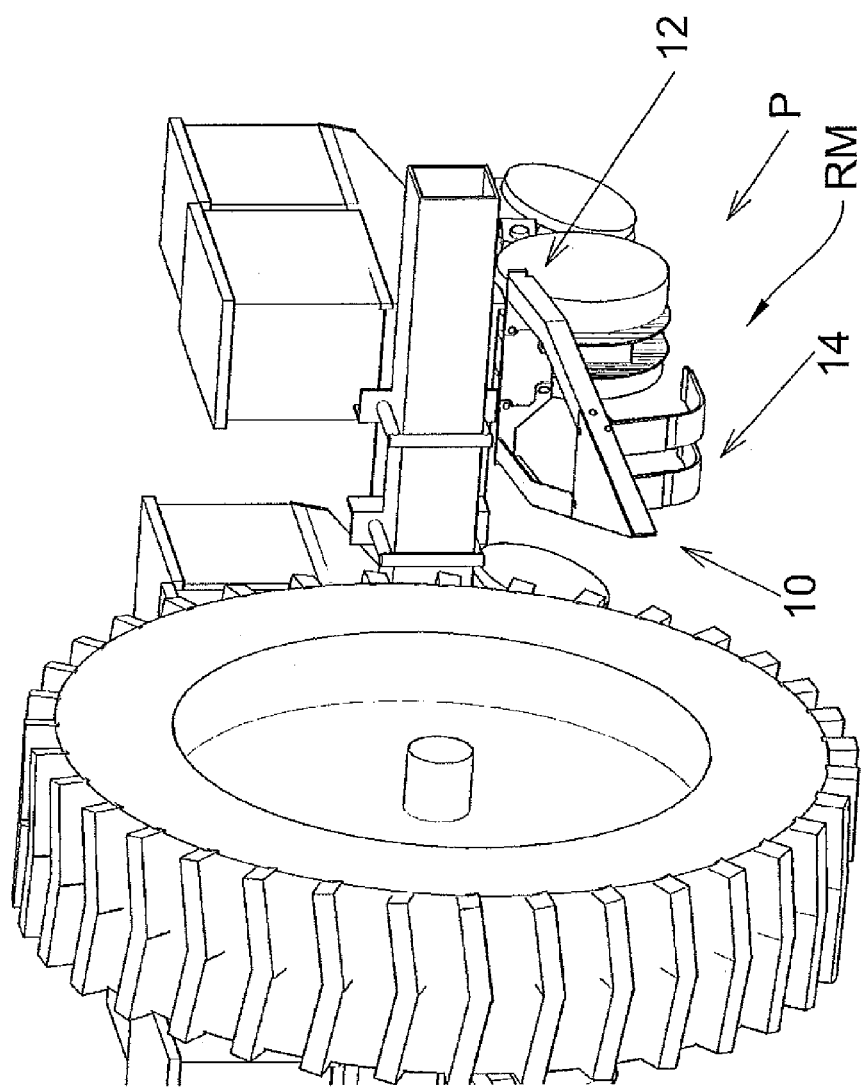
FIG. 1 is a top perspective view of the residue manager apparatus connected to a conventional planting mechanism.

The residue manager RM of current invention is generally shown in FIG. 1. For the purpose of this disclosure, a "residue manager" is defined as an apparatus used to manage cover crops in an agricultural system.

In the preferred embodiment, the residue manager RM comprises an attachment that bolts on to a planting apparatus P. The planting apparatus P and residue manager RM are generally propelled across a field of cover crops by a tractor. In alternative embodiments, the residue manager RM and associated planter P may be self-propelled or may be propelled by any means known in the art and may include additional implements.

As shown in FIG. 1, in the preferred embodiment, a leading portion 10 of the residue manager RM has a wedge shape so that relatively tall stalks of a cover crop are deflected to either side of the residue manager RM body. A trailing portion 12 of the residue manager RM comprises an attachment means. Two slidable crop depressing means 14 (hereinafter "press shoes") are attached to an intermediate portion of the residue manager. As the residue manager RM advances, the press shoes 14 generally flatten the cover crop residue in the path of the residue manager RM.

Figure 2:
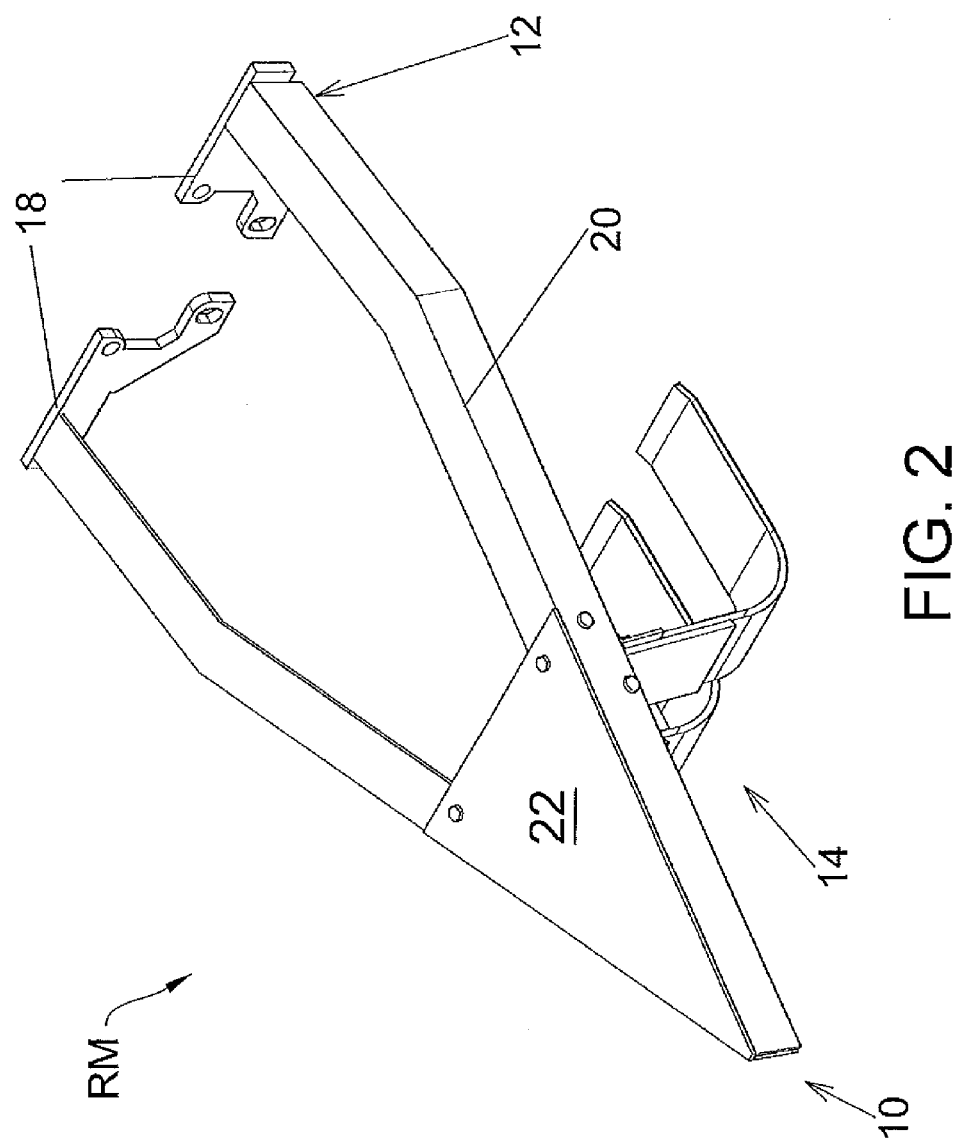
FIG. 2 is a top perspective view of the residue manager disconnected from the planting mechanism.

FIG. 2 shows the residue manager RM in greater detail. In the preferred embodiment, the residue manager RM comprises a generally "A" shaped frame 20. As described supra, the leading portion 10 of the frame 20 is generally wedge-shaped to deflect cover crop stalks. A bracing plate 22 may be bolted or welded to the leading portion 10 to increase the structural integrity of the residue manager RM. The trailing portion 12 of the frame 20 comprises a mounting flange 18. The flange 18 has a shape and bolt pattern compatible with the planter P (see FIG. 1) to which the residue manager RM will be attached.

In alternative embodiments, the leading portion 10 may be customized to adapt the residue manager RM to anticipated field conditions and the nature of specific cover crops. For example, the shape of the frame 20 may be modified to have less of a wedge shape and more closely resemble a "U". The leading portion 10 of the residue manager RM may also include a variety of panels and/or guides designed to direct the cover crop stalks downward and thereby minimize the mechanical drag associated with the planting process.

Figure 3:
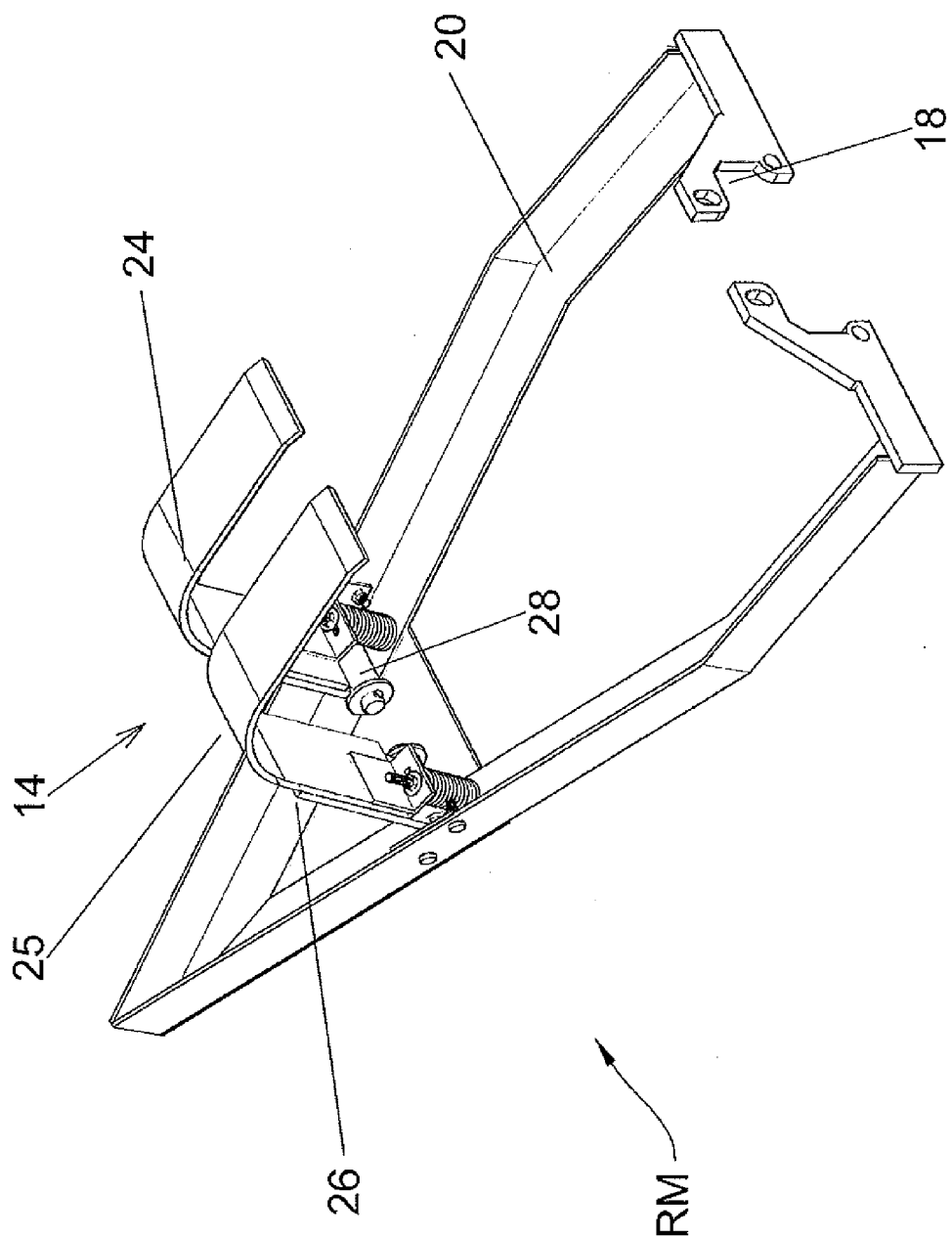
FIG. 3 is a perspective view of the disconnected residue manager in an inverted position so that the underside side and the bottom components or the residue manager are clearly visible.

FIG. 3 shows the residue manager RM in an inverted position so that the two press shoes 14 are more clearly visible.

(Note that, for simplicity, FIG. 3 component reference numbers only refer to one component although there may be multiple examples of the component in FIG. 3). Each press shoe 14 has a general "L" shape and comprises a horizontal member 24 that flattens and depresses a cover crop, and a pivotal vertical member 26 that attaches to the frame 20.

A rounded knee 25 directly connects the horizontal member 24 with the vertical member 26. The shape of the knee 25 and the horizontal member 24 enables the residue manager RM to slide across and (at least temporarily) flatten the cover crops. In at least one alternative embodiment, a coulter disc may be positioned between the two press shoes 14 so that the coulter disc slices through the flattened residue.

The vertical member 26 and horizontal member 24 may be reinforced by various structural plates and gussets to accommodate the stresses associated with the function of the residue manager RM. The vertical 26 and horizontal 24 members may also be adjustable to accommodate a variety of cover crops, terrains, and planters P. In alternative embodiments, the residue manager RM may comprise any number of press shoes 14 and the general shape of the press shoes 14 may be varied consistent with the function of depressing the cover crop.

As shown in FIG. 3, the press shoes' 14 vertical members 26 are pivotally attached to the frame 20. An expansion means 28 urges the horizontal member 24 (via the vertical member 26) to pivot away from the frame 20. In operation, this configuration maximizes the contact between the horizontal member 24 of each press shoe 14 and the cover crops, even as a field's terrain changes. In the preferred embodiment, the expansion means 28 comprises a compression spring mechanism. However, in alternative embodiments, the expansion means 28 may comprise a compressed gas shock absorber mechanism, or any other expansion mechanism known in the art.

Figure 4:
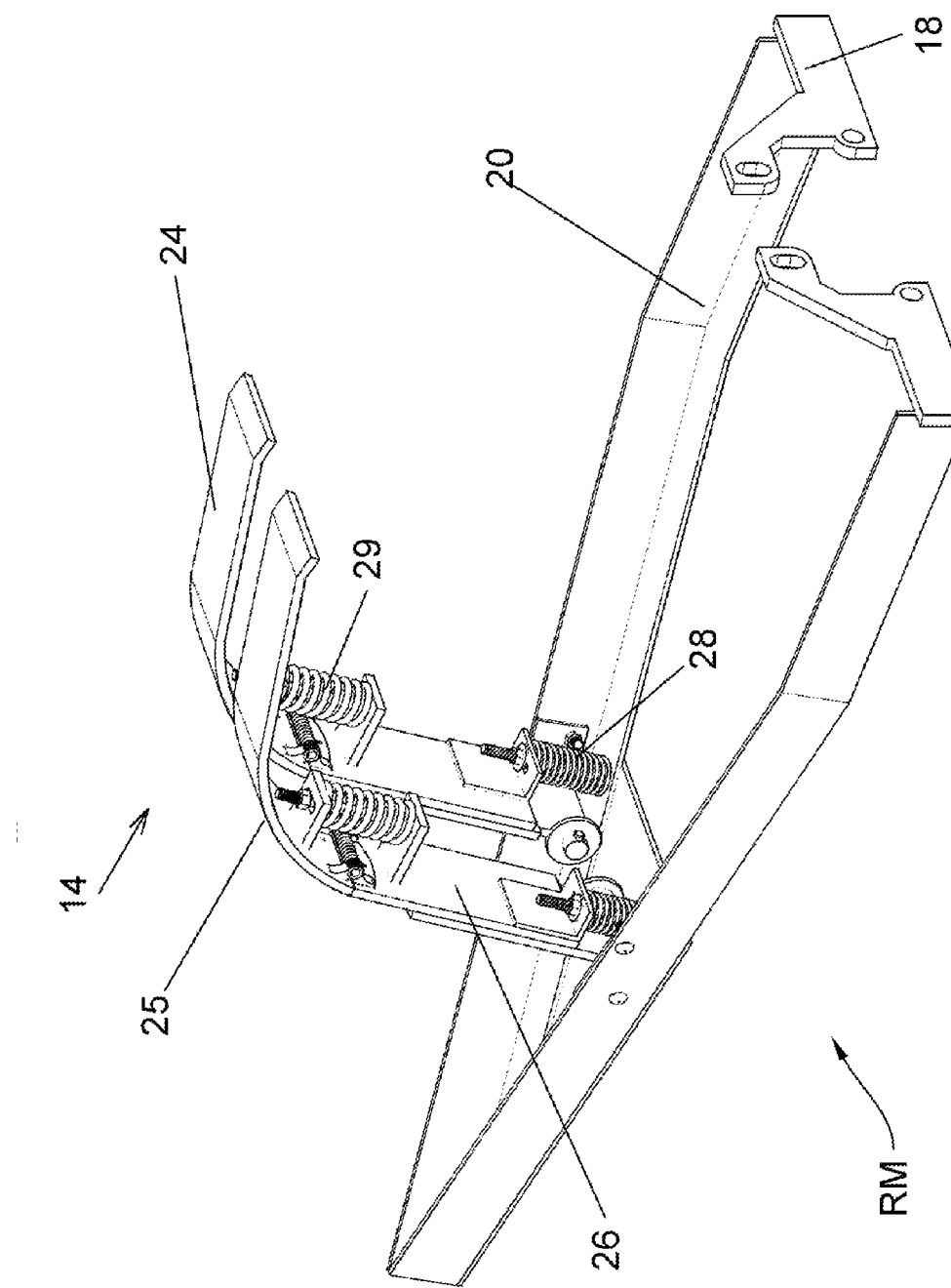
FIG. 4 is a perspective view of an alternative embodiment of the residue manager.

As shown in FIG. 4, in an alternative embodiment, an expansion means 29 may be disposed between the vertical member 26 and the horizontal member 24. In this configuration, the vertical 26 and horizontal 24 members comprise two separate but pivotally connected components whereby a first end of the expansion means 29 is attached to the vertical member 26 and a second end of the expansion means 29 is attached to the horizontal member 24. This arrangement allows the press shoes 14 even greater flexibility in conforming to non-level terrain.

For the foregoing reasons, it is clear that the invention provides an innovative crop residue manager that may be used in a variety of applications. The invention may be modified in multiple ways and applied in various technological applications. The current invention may be modified and customized as required by a specific operation and the individual components may be modified and defined, as required, to achieve the desired result. For example, the shape and size of the residue manager RM may be varied to accommodate a variety of cover crops and planting mechanisms P.

Although the materials of construction are not described, they may include a variety of compositions consistent with the function of the invention. Such variations are not to be regarded as a departure from the spirit and scope of the invention, and all such modifications as would be obvious to one skilled in the art are intended to be included within the scope of the following claims.

What is claimed is:

1. A cover crop residue manager comprising:
    a leading portion deflecting cover crops away from a planting mechanism;
    at least two essentially parallel cover crop depressing means structured to depress the cover crops adjacent to the planting mechanism, each of the cover crop depressing means comprising a vertical member that is pivotally connected to a rearwardly extending horizontal member; and,
    a trailing portion connected to the planting mechanism;
    whereby the horizontal member comprises a relatively broad, smooth, flat bottom surface extending essentially parallel to a surface of a field of cover crops so that as the residue manager moves across the field of cover crops, the cover crops are depressed and deflected away from the planting mechanism.

2. The residue manager of claim 1 further comprising a frame connecting the leading portion with the trailing portion.

3. The residue manager of claim 2 wherein the frame has a general "A" shape so that the leading portion has a wedge shape.

4. The residue manager of claim 1 wherein the horizontal member is connected to the vertical member via a rounded knee.

5. The residue manager of claim 1 wherein the at least two cover crop depressing means are structured so that the residue manager slides across the cover crops.

6. The residue manager of claim 1 wherein a length of at least one of the vertical member or the horizontal member is adjustable.

7. The residue manager of claim 1 wherein a first end of an expansion means is connected to the vertical member and a second end of an expansion means is connected to the horizontal member.

8. The residue depressing means of claim 2 wherein the vertical member is pivotally connected to the frame.

9. The residue manager of claim 8 further comprising an expansion means structured to urge the horizontal member away from the frame so that the cover crop depressing means maintains contact with the cover crops even as the terrain changes.

10. The residue manager of claim 9 wherein the expansion means comprises a compression spring.

11. The residue manager of claim 9 wherein the expansion means comprises a gas shock absorber.

12. The residue manager of claim 8 wherein a first end of the expansion means is connected to the vertical member and a second end of the expansion means is connected to the frame.

13. The residue manager of claim 1 wherein the trailing portion comprises a flange configured to bolt to the planter.

14. A method of planting a cash crop, the steps of the method comprising:
    providing the residue manager and the planting mechanism of claim 1; and
    propelling the residue manager and the planting mechanism across a designated field of cover crops so that as the residue manager deflects and flattens the cover crops, and the planting mechanism plants the cash crop.

15. A method of making a cover crop residue manager, the steps of the method comprising:
    (a) providing a frame having a leading portion, an intermediate portion, and a trailing portion;
    (b) shaping the leading portion of the frame into a wedge shape;
    (c) pivotally attaching at least two essentially parallel cover crop depressing means to the intermediate portion of the frame, each of the cover crop depressing means comprising a vertical member that is pivotally connected to a rearwardly extending horizontal member; and (d) connecting the trailing portion of the frame to a planter, so that as the planter is propelled across a field, the leading portion deflects the crop residue and the at least two crop depressing means depress the cover crop thereby enabling the planter to plant a cash crop.

16. The method of claim 15 wherein, in step (c), the at least two cover crop depressing means each are configured so that the horizontal member and the vertical member are connected with a rounded knee so that the residue manager slides across the cover crop.

17. The method of claim 15 wherein in step (c), the at least two cover crop depressing means each further comprise an expansion means connected between each of the at least two cover crop depressing means and the frame.

18. The method of claim 17 wherein the expansion means comprises one of a compression spring or a gas charged shock absorber.

19. A cover crop residue manager comprising:
a frame;
a leading portion being connected to the frame, the leading portion deflecting cover crops away from a planting mechanism;
at least two essentially parallel cover crop depressing means;
    each of the cover crop depressing means being pivotally connected to the frame;
    each of the cover crop depressing means being structured to depress the cover crops adjacent to the planting mechanism; and,
    each of the cover crop depressing means comprising a vertical member that is pivotally connected to an essentially flat, rearwardly extending horizontal member; and,
a trailing portion connected to the frame and to the planting mechanism.

\* \* \* \* \*